Aug. 4, 1953          R. L. DE MONTEBELLO           2,647,336
           METHOD AND APPARATUS FOR PROVIDING FROM PLANE
                 IMAGES THE APPEARANCE OF SOLID OBJECTS
Filed Aug. 26, 1947                              3 Sheets-Sheet 1
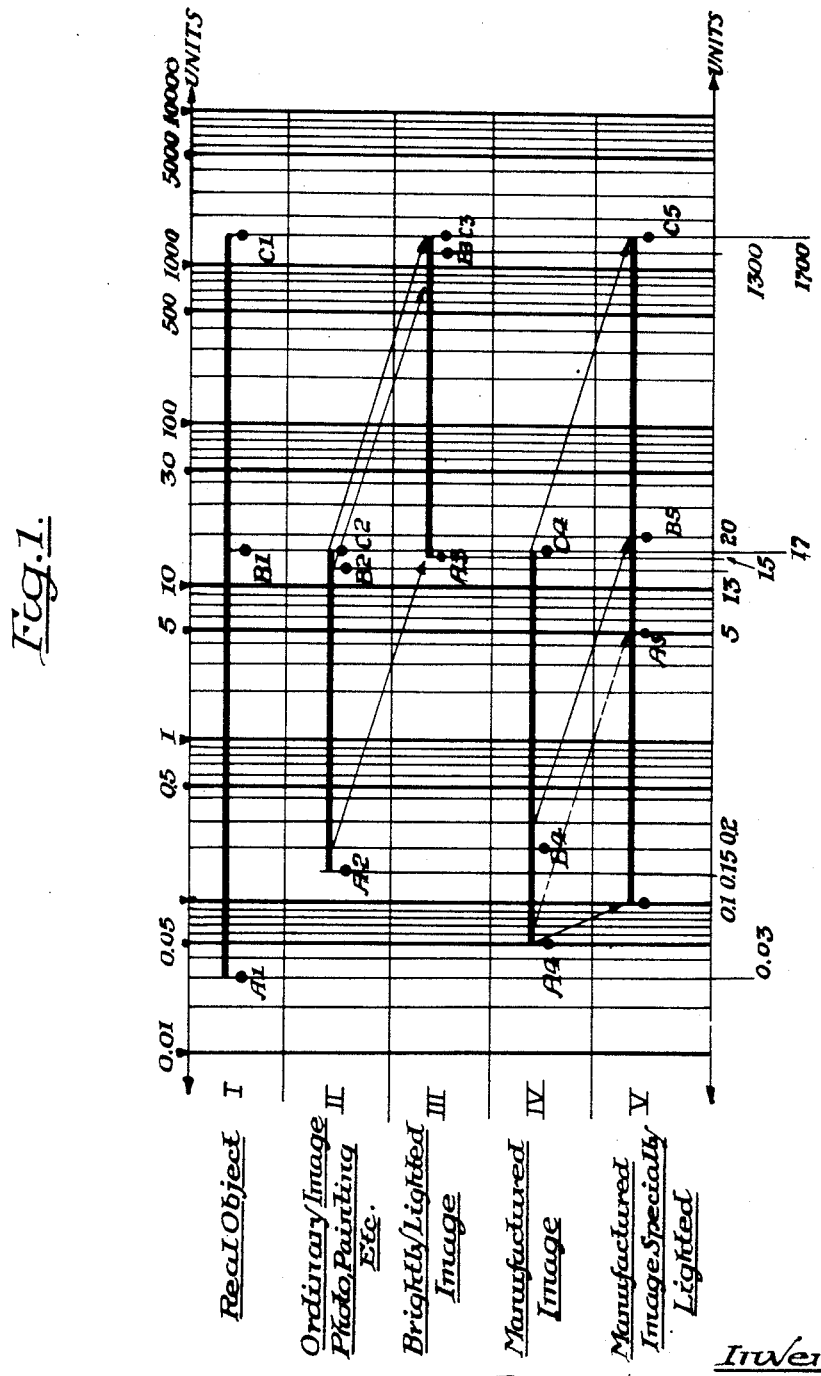
Inventor:
Roger Lannes de Montebello
by his Attorneys,
Howson and Howson.

Aug. 4, 1953  R. L. DE MONTEBELLO  2,647,336
METHOD AND APPARATUS FOR PROVIDING FROM PLANE
IMAGES THE APPEARANCE OF SOLID OBJECTS
Filed Aug. 26, 1947  3 Sheets-Sheet 2
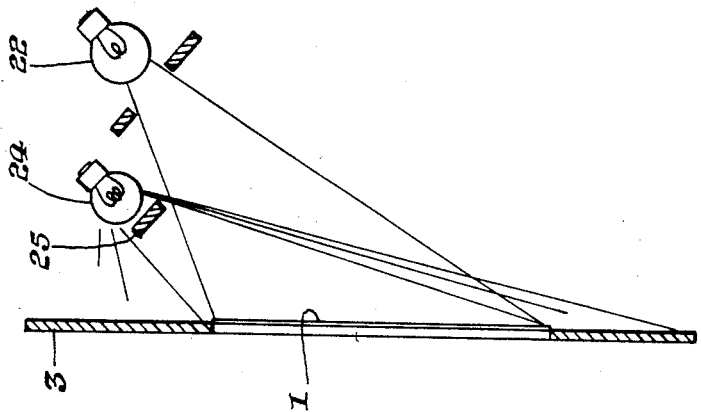
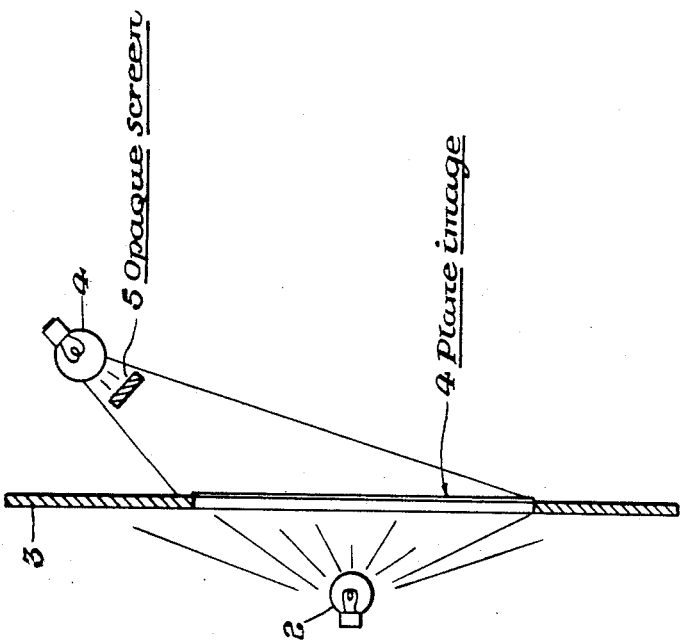
Inventor:
Roger Lannes de Montebello
by his Attorneys.
Howson and Howson.

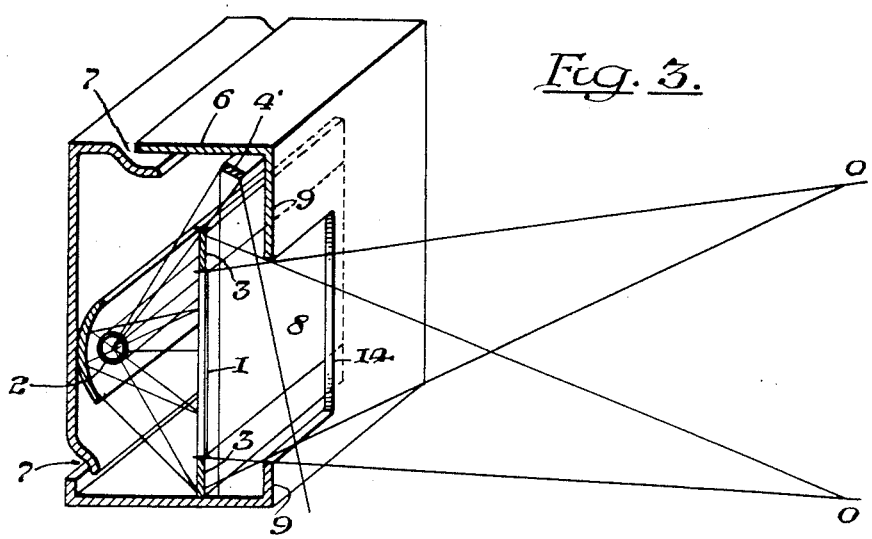
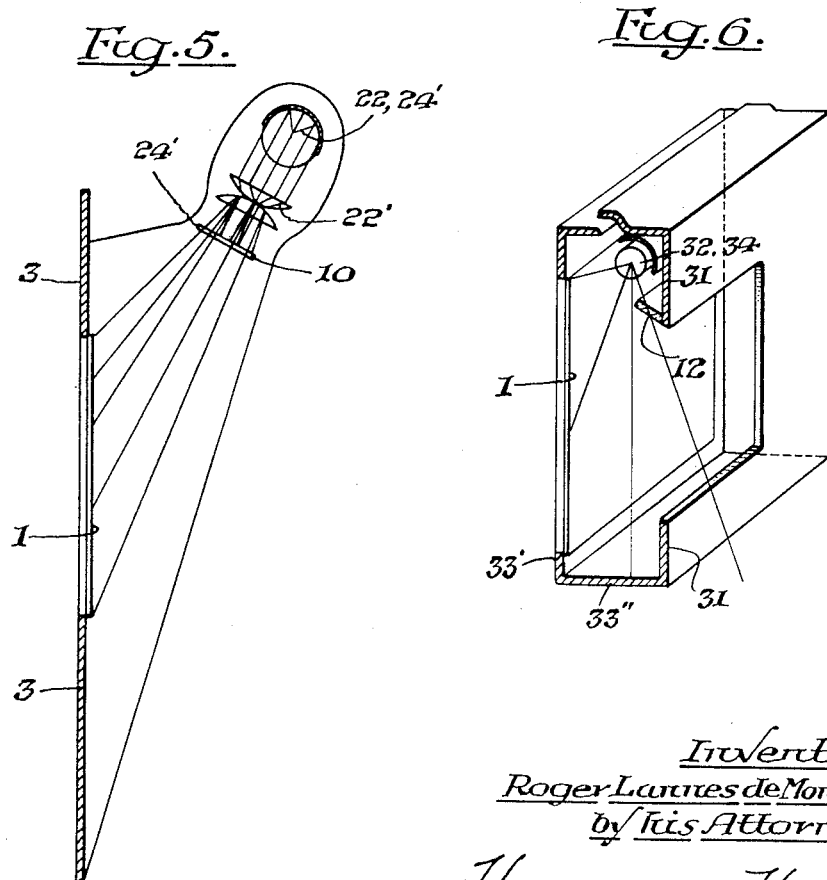

UNITED STATES PATENT OFFICE 2,647,336

METHOD AND APPARATUS FOR PROVIDING FROM PLANE IMAGES THE APPEARANCE OF SOLID OBJECTS

Roger Lannes de Montebello, Paris, France

Application August 26, 1947, Serial No. 770,628
In France February 24, 1944

Section 1, Public Law 690, August 8, 1946
Patent expires February 24, 1964

18 Claims. (Cl. 40—130)

For a long time a method has been sought for giving plane objects the appearance of objects or groups of images in relief, with a view to increasing the illusion of the actual presence of these objects.

Besides the classical methods of painting to deceive the eye, methods have been conceived based on a different view of the same object of the two eyes of the observer, and depending more or less on the principle of the two well known methods, the stereoscope or the anaglyphe.

It is established that such methods, even though they give a perfect impression of relief, nevertheless do not create the illusion of the actual presence of the objects. On the contrary, monocular vision of a solid object (as for example with one eye closed) which clearly does not permit the perception of stereoscopic relief, gives however an impression which is generally much more real than all the stereoscopic methods.

While studying this problem, I have found that the difference in the ocular impression perceived upon looking at, on the one hand, a plane image and on the other hand, the represented object or objects themselves, does not depend exclusively nor even essentially, on the effect of relief.

I have found that this difference between the ocular impression produced by the image and the ocular impression produced by the real object, resides essentially in the difference between the brightness of the different parts of a real object or group of objects and the brilliance of the corresponding parts of the image.

In fact with normal drawing and photographic methods one does not obtain on one image a zone having the same brightness as that of a directly lighted reflecting surface and a zone as dark part of a real object on which the shadow of another opaque object falls.

Referring to the drawings, Fig. 1 is a diagram showing a comparison between the brightness of several parts of a real object and of its representation produced by known means.

As is usual with this kind of measurement, this diagram is constructed in units spaced according to a logarithmic scale, the progression of such a scale corresponding approximately to the progression of retinal perceptions.

Scale I indicates the value in units of characteristic parts of a real object the centre of which is placed 40 cms. from an electric light bulb screened by a diffusion screen of 100 cm.$^2$ surface which shows a brightness of 1700 units.

Point $A_1$ corresponds to the darkest parts A of the object, that is to say, the black parts on which the shadow of an opaque object falls. Its brightness is 0.03 unit.

Point $B_1$ corresponds to the mat white parts B which are perpendicularly illuminated and placed 40 cm. from the source. Its brightness is 17 units.

Point $C_1$ corresponds to the reflecting parts C from which light is reflected. Its brightness is 1700 units.

It is of course understood that the various colors of the spectrum lead to intermediate values between the characteristic points $A_1$, $B_1$, $C_1$.

Scale II indicates the value in units of the corresponding parts of a normal drawn or photographic representation, illuminated under the same conditions as the object.

It will be seen that these values are scaled between a point $A_2$ of brightness 0.15, that is to say less dark than point $A_1$, and a point $C_2$ the brightness of which is substantially equal to that of point $B_1$, in such a way that, in order to conform approximately to the relative scale of values, point $B_2$ corresponding to point $B_1$ of the real object must be given a weaker brightness than that of $B_1$ (for example 13 units).

It can now be easily understood, that, however much care is taken in the reproduction of the actual colors of an image and in the making of its relief, this image can never give the illusion of the presence of a solid object, as long as the scale of brightnesses of its different parts deviates to such an extent from that of the real object.

By the method according to the invention it is proposed to produce accurately from a given object, illuminated by a luminous source of suitable intensity $(i)$, an image which, while appearing to the observer to be subjected uniformly to the same illumination of intensity $(i)$, shows on its various parts brightnesses equaling as exactly as possible those of the corresponding parts of the object.

It is known that, in order to increase the brightness of the whole or part of an image it may either be subjected to an intense illumination, or certain parts of the image may be rendered transparent or translucent the whole being illuminated by a luminous source placed behind the image. However these two methods have the effect of increasing the brightness of all parts of the image under the same conditions. If the intensity of light is such as to cause point $C_2$ to have the brightness of point $C_1$ that is to say the brightness of point $C_2$ is multiplied by 100 in replacing point $C_2$ by a point $C_3$ of brightness 1,700 units on scale III, the brightness of points $A_2$ and $B_2$ will be equally multiplied by 100; point $A_2$ being replaced by a point $A_3$ of brightness 15 units and point $B_2$ being replaced by a point $B_3$ of brightness 1,300. The aspect of the image will again be very different from that of the object. Moreover by comparing the aspect of the border of the image or the surroundings, the observer will immediately notice the disparity, and the effect of actual presence will in no way be obtained.

The method according to the invention is therefore as follows:

Taking as a model an object subjected to a given illumination of intensity $(i)$ firstly an image is produced from this object by handpainting, by photography, by photography and handpainting (e. g. re-touching) or by any suitable means the scale of brilliances of which (scale IV) is different from scale II of the normal image. Point $C_4$ necessarily has the same brightness 17 as point $C_2$ since this brightness has the greatest intensity that can be obtained from the luminous intensity $(i)$. On the other hand it is possible, by the appropriate technical means, to increase the power of absorption of the black zones with respect to that obtained on the usual graphical reproductions. Point $A_4$ now occupies an intermediate position (0.05 for example) between that of points $A_1$ and $A_2$. There is chosen for point $B_4$ corresponding to the white zones a brightness such that its variation with respect to $A_4$ and $C_4$ is slightly greater in relation to the actual variation of $B_1$ with respect to $A_1$ and $C_1$. In other words point $B_4$ has a value in the scale such that $$\frac{A_4C_4}{A_4B_4} > \frac{A_1C_1}{A_1B_1}$$

With a normal image, the opposite is found, that is to say:

$$\frac{A_2C_2}{A_2B_2} < \frac{A_1C_1}{A_1B_1}$$

I have found that if an image conforming to scale III is subjected to a special illumination of intensity $I > i$ such that it has the effect of giving the brightness of point $C_4$ a value $C_5$ (scale V) equal to that of point $C_1$ (that is to say 1,700 units in the case of the example being considered) the characteristic point $B_4$ asumes a brightness substantially equal to that of the actual characteristic point.

Point $A_4$ assumes a brightness $A_5$ higher than that of $A_1$ but it may be set at a value $A'_5$ in the neighbourhood of $A_1$ by screening corresponding parts in a convenient manner from the increase of luminous intensity.

Nevertheless, correspondence of the scale of brightnesses of the image with that of the object can not give the impression of the actual presence of the object, if the observer notices the trick used. That is to say, the impression is lost if he notices consciously or unconsciously that the image is subjected to a luminous intensity I much greater than that to which the object which it represents was subjected particularly if he notices the contrast between the image itself and its surroundings.

The invention is therefore equally concerned with means for concealing the presence of a special luminous source. The invention aims on the contrary to give the impression that the object represented and its immediate surroundings are illuminated by a source whose position and intensity correspond to that of the source which illuminated the actual object.

The accompanying drawings show by way of example several ways of producing these results.

Fig. 2 is a side section view illustrating diagrammatically one form of the invention.

Fig. 3 is a perspective view, partly in section, diagrammatically illustrating apparatus embodying another form.

Fig. 4 is a side section view illustrating diagrammatically a third form of the invention.

Fig. 5 is a side elevation section view diagrammatically illustrating a fourth form.

Fig. 6 is a perspective view diagrammatically illustrating a fifth form of the invention.

The arrangement represented diagrammatically in Figure 2 essentially comprises the following elements:

(a) An image 1 of the actual object to be represented, produced (under conditions which will be set forth below) in such a way that, once subjected to an illumination from behind of intensity I, the scale of brightnesses of its three characteristic parts, defined above, clearly corresponds to scale V of the diagram in Figure 1, the scale of brightnesses of the intermediate points being derived from this.

(b) A luminous source 2, directing on the image from behind, a beam of light of intensity I.

(c) An opaque screen mask or partition 3 extending to the image 1 and surrounding it, and visible from the front, constituting a border or frame for the image and concealing the rear light from the observer. The screen may be made of any material commonly used for mats or borders for pictures.

(d) A luminous source 4 preferably provided with an opaque screen 5 in such a way that no direct light falls on the image 1 but illuminates on the contrary the outline or frame 3 of this image. The screen may be supported by conventional means or in any suitable manner in front of the light source.

The intensity of this source 4 is so chosen that it produces on this border 3 an illumination substantially equal to that of the object serving as model for the image 1. The observer 0 looking at this image will thus have the impression that the whole is illuminated by the source 4 and will not notice the presence of the rear source 2. He will thus have the impression that the most luminous parts of the image 1 receive their luminosity from the source 4 the relatively feeble intensity of which he can appreciate. Actually however (as will be explained more fully hereinafter) the most luminous parts, the highlights for instance, will derive their luminosity only from the rear light source 2. He will thus have the impression that the image presents the same scale of luminosity as a real object. He will have the impression of reality.

The image 1 may be prepared by handpainting, i. e. using artists' materials, or by the use of a colored photograph or diapositive on glass or film.

When prepared by handpainting, the surface to be painted may consist of either a material such as a strong kind of Bristol board. Or, the surface may be a translucent material, preferably white, coated on glass or a film as in the case of the colored photograph or diapositive, and which may be made more translucent or even transparent when need arises. The surface to be painted is subjected to the same condition of illumination it will have when the image is displayed, i. e. rear illumination by source 2 and front illumination by source 4, without the screen 5.

During the making of the picture or image the model or subject is illuminated only by a source analogous to source 4.

All parts of the surface to be painted corresponding to the parts of the object whose brightness is equal to or less than white (point B, of the diagram of Fig. 1) are made opaque by applying the proper amount of paint. Then the parts of the surface which correspond to the values of the object having increased brightness, i. e. medium brightness or extreme high lights are rendered more or less translucent or even transparent so that under the effect of the rear source 2 they show such increased brightness. To render such areas or spots more or less translucent or transparent, the surface may be made thinner by rubbing or scraping or any other conventional way so that more light passes through from behind adding brightness as required.

The translucent or transparent parts of the surface are then colored. These parts correspond to those of the object which although brighter than the white of brightness B, are themselves colored. In other words, the high lights are not necessarily white but are sometimes colored in the object; so they are colored in the image.

Next, the exact values of the colors and shadows of the object darker than the white B, are copied taking care to strengthen the blacks to the maximum to reach point A.

It will be noted that if the image thus obtained is examined without the rear illuminating means 2, its values appear false, especially because the colors placed on the translucent parts appear to be too dark.

The brilliant objects show no obvious indication of the position of their reflections.

If a colored photograph or a diapositive on glass or film is used to obtain this image, such a diapositive should undergo a special treatment such as retouching by hand in order to accentuate the difference in brightness of the extreme points $A_1$ and $C_1$.

Such special treatment comprises darkening the darkest parts in order that they stay black even under the effect of intense illumination from behind. In this case only the darkest parts will be completely opaque. The special treatment also includes making the bright areas or spots more transparent in order to give the impression of reflection or of light (i. e. brightness as for example of point $C_1$).

In practice, the means of illumination and observation shown diagrammatically in Figure 2 may be realized in numerous ways.

Figure 3 shows an embodiment in which the whole of the device is mounted inside a box frame 6 provided with ventilation windows 7 and an observation window 8 the edges 9 of which are located so as to limit the field of vision of the observer.

The image 1 is treated in the manner indicated above so as to preserve the black and opaque parts and the transparent parts, apparently luminous under the effect of the rear intense luminous source 2. The front source 4 is replaced by a mirror 4', receiving part of the luminous flux from the source 2. This mirror is inclined so as to project a luminous flux substantially parallel to the image and appearing to illuminate it, when in fact this image is only lit by the source 2. This artificial effect of illumination is strengthened by the fact that the beam from the mirror 4' illuminates the side of the edges 9 of the surrounding frame with an intensity $i$. If, on the other hand, the outline or marginal area 3 around the image 1 is made of translucent material and is illuminated by the source 2, the degree of brightness of the outline 3 may be such (in comparison with the brightness of the image) that it (the outline) appears to be lighted by the mirror, thereby giving to the observer the impression that the image, outline and edge of the window 8 are all lighted by the mirror 4'. As an alternative, at the limit of the edges of the image, a limit which the observer can see when he moves, mirrors may be placed perpendicular to the image which reflect it in its continuation, thus preventing the observer from discerning the difference in illumination beyond the outlines of the image.

Figure 4 illustrates diagrammatically a second method of carrying out the invention.

In this method, the image 1 is treated as will be described below in such a way that, when subjected to illumination from an intense rear source 22, its parts corresponding respectively to the respective reflecting or luminous parts $C_1$, whites $B_1$, and nonilluminated blacks $A_1$ of the object have brightness as nearly as possible equal to the object.

The source 22 is concealed from the observer and its luminous flux is directed by screens or other suitable means on the whole or a part of the image, excepting its border 3.

On the other hand a second front source 24, preferably provided with a screen 25, illuminates the frame but not the image 1. The intensity of this source being determined in such a way as to produce on the frame an illumination of the same intensity as that to which the object was subjected. The observer will have the impression that the whole image is subjected to the same illumination as the object and that, under this illumination, it shows the same scale of brightnesses as the real object. He will again have the impression of reality.

The image 1 for display with two front lights as in Fig. 4 is obtained in the following way in the case of manual production.

The object is subjected to an illumination analogous to that of the source 24 alone. The surface to be painted is subjected to illumination from the two sources 22 and 24 under the same conditions as used for the finished image. The surface to be painted, preferably glossy, is first given a bottom coat of very dark grey so that the illumination from source 22 causes this coat to appear as white as the white of the object subjected only to source 24, that is, gives it a brightness $B_1$.

On the first coat the image is then handpainted by anyone skillful enough to do so keeping to the exact actual values of the object. This will be simplified since, while one uses a lighter tone than the dark grey coat, this tone will necessarily appear lighter than the white, that is to say will show a brightness greater than $B_1$. Moreover pure white is only used for the brightest reflections on the object. In order to paint the darkest zones, the most absorbent paint possible is used; and they will be varnished.

Furthermore reinforcement of the blacks will be obtainable by special means described below in connection with Figure 5.

On this Figure 5, the two luminous sources 22 and 24 are blended into one, the intense luminous flux illuminating the image properly called, 1, being obtained by means of a light condenser 22', while the less intense luminous flux illuminating the border 3 of the image is produced by the light diffused on the outer sides of a diffuser 24' surrounding the source. This strategem being invisible to the observer, he will have the impression that the whole image and border is illuminated by a luminous flux of low intensity.

In order to reinforce the blacks of the image, a transparent screen 10 can, in this case, be placed in front of the condenser. The screen is opaque in the parts placed in the path of the light rays striking the parts of the image which should be the darkest. In other parts the screen will be transparent. A shadow effect is thus obtained on the darkest parts which allows the obtaining of the weakest brightnesses of the order of those indicated at A'5 in the diagram of Figure 1.

In a general way moreover, the contrasts of the image can be reinforced by using as the screen 10, a smaller reproduction on glass of this image, the light and dark parts of which will be contrasted to the maximum as was described for the obtaining of the image of the process represented in Figures 2 and 3. In that way less light from the source will be permitted to fall on the dark parts thereby making them appear darker.

Figure 6 shows a variation of Figure 5 in which there is likewise only used a single source 32—34 but in which the effect of contrast between the illumination of the image and the illumination of its border is obtained by different means. The image 1 is surrounded by a projecting border 31 disposed so that the observer can only see around the image the parts 33', 33''. An absorbent screen 12 is placed on the path of the light rays falling on the outer part 31, and the surfaces 33' and 33'' are rendered very dark so that, under the direct illumination of the luminous source, they show a brightness analogous to that of the outer part 31 which is illuminated less intensely due to the screen 12. The observer will thus have the impression that the whole of the image is subjected to the same weak illumination as the outer parts or frame 31 and the desired result will be obtained.

It will be understood that many other means of illumination can be used without departing from the scope of the invention, and that other means than those described can be used practically to obtain images satisfying the conditions that have been defined.

I claim:

1. The method for creating with a plane image the impression of the actual presence of an object illuminated by at least one luminous source of determined intensity and position comprising providing a plane image in which the very dark areas are made opaque and the very bright areas are made thin, illuminating said image with a second source of greater intensity than the first-mentioned source, said image when displayed with said second source having its zones of respective brightnesses substantially equal to the brightnesses of the corresponding zones of the actual object as seen under said first-mentioned source, concealing from the observer the actual intensity and position of the second source, and displaying the image in illumination giving to the observer the impression that the represented object is illuminated by a luminous source whose intensity and position correspond to those of the source that illuminated the actual object.

2. The method claimed in claim 1 wherein the second source is placed behind the image.

3. The method as claimed in claim 2 wherein the means which gives the impression that the represented object is illuminated by a luminous source as in the actual object, only directly illuminates the frame or border of the image.

4. The method claimed in claim 1 wherein the second source is placed behind the image, further characterized by reflecting a part of the light from said second source to give the impression that the represented object is illuminated by a luminous source as in the actual object.

5. The method claimed in claim 1 wherein the second source is placed behind the image and further characterized by screening said second source as by a screen having opaque parts placed in the paths of the light rays of said second source, in order to lessen the brightness of the largest parts of the image.

6. The method claimed in claim 1 wherein the second source is placed behind the image and further characterized by screening said second source as by a screen having opaque parts placed in the paths of the light rays of said second source, in order to lessen the brightness of the darkest parts of the image and wherein the means which gives the impression that the represented object is illuminated by a luminous source as in the actual object, only directly illuminates the frame or border of the image.

7. The method claimed in claim 1 wherein the second source is placed behind the image, and further characterized by screening said second source as by a screen having opaque parts is placed in the paths of the light rays of said second source in order to lessen the brightness of the darkest parts of the image, further characterized by reflecting a part of the light from said second source to give the impression that the represented object is illuminated by a luminous source as in the actual object.

8. A process as claimed in claim 1 wherein the parts of the image intended to show the greatest brightness are fluorescent.

9. The method for creating with a plane image the impression of an actual presence of the object illuminated by at least one luminous source of determined intensity and position comprising providing a plane image in which the very dark areas are made opaque and the very bright areas are made thin, illuminating said image from the front with a second source of greater intensity than the first-mentioned source, said image when displayed with said second source having its zones of respective brightnesses substantially equal to the brightnesses of the corresponding zones of the actual object as seen under the first-mentioned source, concealing from the observer the actual intensity and position of the second source, and displaying the image in illumination giving to the observer the impression that the represented object is illuminated by a luminous source whose intensity and position correspond to those of the source that illuminated the actual object.

10. The method for creating with a plane image the impression of the actual presence of an object illuminated by at least one luminous source of determined intensity and position comprising providing a plane image in which the very dark areas are made opaque and the very bright areas are made thin, illuminating said image from the front with a second source of greater intensity than the first-mentioned source, said image when displayed with said second source having its zones of respective brightnesses substantially equal to the brightnesses of the corresponding zones of the actual object as seen under said first-mentioned source, concealing from the observer the actual intensity and position of the second source, displaying the image by only directly illuminating the frame or border of the image to give the impression to the observer that the represented object is illuminated by a luminous source whose intensity and position correspond to those of the source that illuminated the actual object.

11. The method for creating with a plane image the impression of the actual presence of an object illuminated by at least one luminous source of determined intensity and position comprising providing a plane image in which the very dark areas are made opaque and the very bright areas are made thin, illuminating said image with a second source of greater intensity than the first-mentioned source, said image when displayed with said second source having its zones of respective brightnesses substantially equal to the brightnesses of the correspoiding zones of the actual object as seen under said first-mentioned source, concealing from the observer the actual intensity and position of the second source, displaying the image by only directly illuminating the frame or border of the image to give the impression to the observer that the represented object is illuminated by a luminous source whose intensity and position correspond to those of the source that illuminated the actual object.

12. The method as claimed in claim 10 further characterized by concentrating a part of the second source on the image while diffusing another part to illuminate with lesser brightness the border of the image.

13. The method as claimed in claim 10 further characterized by concentrating a part of the second source on the image and diffusing the part which falls on the border by employment of an absorbent screen.

14. The method of claim 10 wherein the second source illuminates the image from the front and including lessening the brightness of the darkest parts of the image by screening said darkest parts entirely from said second source, as with a screen having opaque parts.

15. The method claimed in claim 1 wherein the second source illuminates the image from the front and including lessening the brightness of the darkest parts of the image by screening said darkest parts entirely from said second source, as with a screen having opaque parts.

16. The method as claimed in claim 1 further characterized by lessening the brightness of the darkest parts of the image by completely obstructing, as with a screen having opaque parts, the light rays from said second source.

17. The method of claim 16 further characterized by only directly illuminating the frame or border of the image with the source which gives the impression that the represented object is illuminated by a source as in the actual object.

18. The method of creating with a plane image the impression of the actual presence of an object illuminated by a concentrated luminous scurce of determined intensity and position comprising preparing a plane image of the subject on a surface which is subjected to the same lighting as is to be used when the image is displayed, in which image the very dark areas are made opaque and the very bright areas are made thin, displaying the image by illuminating it with a second source of greater intensity than said concentrated source, and said second source together with the normal lighting of the surroundings where the image is displayed giving said different parts the respective brightnesses, from deepest absorbent black to brightest reflecting highlight, substantially equal to the brightnesses of the corresponding parts of the actual object as seen under said concentrated source, concealing from the observer the actual intensity and position of the second source, displaying the image by only visibly directly illuminating the frame or border of the image giving the impression to the observer that the represented object is illuminated by a luminous source whose intensity and position correspond to those of the source that illuminated the actual object.

ROGER LANNES de MONTEBELLO.

References Cited in the file of this patent

UNITED STATES PATENTS

| Number | Name | Date |
|---|---|---|
| 1,221,277 | Bostock | Apr. 3, 1917 |
| 1,817,397 | Sarafian | Aug. 4, 1931 |
| 1,953,471 | Eich | Apr. 3, 1934 |
| 2,295,467 | Haley | Sept. 8, 1942 |

FOREIGN PATENTS

| Number | Country | Date |
|---|---|---|
| 204,190 | Great Britain | Sept. 27, 1923 |
| 395,323 | France | Dec. 24, 1908 |
| 505,250 | Great Britain | May 3, 1939 |
| 630,045 | Germany | May 19, 1936 |
| 759,783 | France | Nov. 23, 1933 |
| 770,724 | France | July 2, 1934 |
| 780,254 | France | Jan. 29, 1935 |